(No Model.)

W. D. ROBINSON.
NUT LOCK.

No. 487,684.  Patented Dec. 6, 1892.

Witnesses:
J. C. Mattoon,
F. Parker Davis.

Inventor:
William D. Robinson,
By Chas. B. Mann
Attorney.

UNITED STATES PATENT OFFICE.

WILLIAM D. ROBINSON, OF EL PASO, TEXAS, ASSIGNOR OF ONE-THIRD TO WILLIAM H. SAVAGE, OF SAME PLACE.

NUT-LOCK.

SPECIFICATION forming part of Letters Patent No. 487,684, dated December 6, 1892.

Application filed April 15, 1892. Serial No. 429,247. (No model.)

*To all whom it may concern:*

Be it known that I, WILLIAM D. ROBINSON, a citizen of the United States, residing at El Paso, in the county of El Paso and State of Texas, have invented certain new and useful Improvements in Nut-Locks, of which the following is a specification.

This invention relates to an improved base-washer nut-lock, the object being to provide a construction which is readily applicable and also efficient for the purpose.

To this end the invention consists in the novel features of construction and combinations of parts hereinafter described.

The invention is illustrated in the accompanying drawings, in which—

Figure 1:
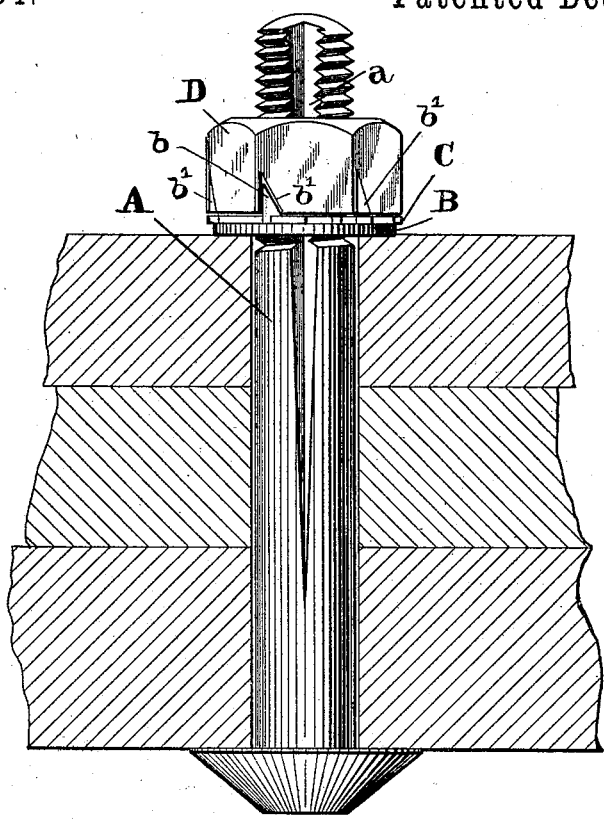
Figure 2:
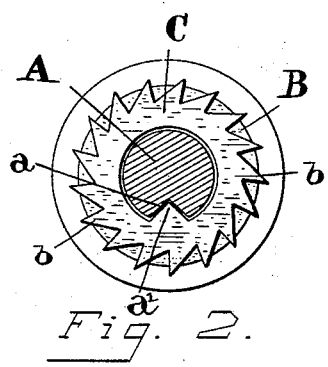
Figure 3:
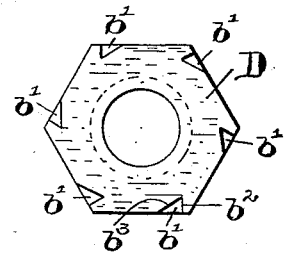

Figure 1 shows a side view of a bolt and nut locked by my improved arrangement. Fig. 2 shows a top view of the bolt with the locking-washer thereon. Fig. 3 shows a bottom view of the nut.

The device is intended for use on railroads and other places where it is necessary to lock a nut on a bolt to prevent it from turning, and the bolt A is provided with a longitudinal side groove $a$, extending from the top a sufficient distance. After the bolt is inserted an ordinary washer B will be fitted upon it. Then a locking-washer C is placed on. This locking-washer consists of a flat circular disk having a central opening to receive the bolt and a spur $a'$ projecting thereinto to engage the groove $a$ in the bolt and prevent the washer from turning. The periphery of the washer is serrated to form teeth $b$.

The nut D has a notch or recess $b'$ formed in each side face at the bottom edge and having a straight side forming a shoulder $b^2$, which extends at right angles to the side face of the nut and also at right angles to the bottom face of said nut and a beveled side $b^3$, the bevel being from the inner end of the said shoulder outward to the side face of the nut. When the nut has been screwed down tight upon the washer, one or more of the teeth $b$, which come at notches $b'$ in the nut, will be bent up substantially at right angles to the washer and into said notches and will lock the nut securely from turning backward. Each of the teeth has a straight side edge and a beveled edge, and it will be seen the nut is prevented from turning backward by the straight edges of the upturned teeth encountering the straight sides or shoulders $b^2$ of the notches $b'$. If, however, at any time from any cause it should become necessary to tighten the nut, it can be done by applying a suitable tool to the nut and turning the latter forward, which will cause the beveled side $b^3$ of the notch $b'$ to bend out the tooth engaging the latter and the nut, riding over the partially-bent-out tooth to flatten it out into the plane of the washer and allow the notch to advance to the next tooth, which will then be bent up into it. Thus the nut may be tightened without applying an implement to the tooth to bend it out of the notch, but by simply turning forward the nut.

It is obvious that the washer must be of pliable but not springy metal.

Having thus described my invention, what I claim as new, and desire to secure by Letters Patent, is—

The combination of a bolt, a nut provided with a recess in each of its side faces, each recess having a straight shoulder which extends at right angles both to the side face of the nut and the bottom face therereof, and a beveled surface whose bevel is from the inner end of the said shoulder outward to the side face of the nut, a circular base-washer fitting on the bolt and having projecting pliable teeth around its periphery, which teeth may be bent up substantially at right angles to the washer and into the notches of the nut behind the straight shoulders thereof, whereby the nut is prevented from turning backward, and which may also be bent out of said notches by the beveled sides of the same upon turning forward the nut and flattened out into the plane of the washer by the nut riding over the said teeth, whereby the nut may be tightened without the application of an implement to bend the teeth out of the notches, and means to prevent the washer turning on the bolt.

In testimony whereof I affix my signature in the presence of two witnesses.

WILLIAM D. ROBINSON.

Witnesses:
 E. S. NEUMAN,
 B. D. RUSSELL.